United States Patent [19]
Hamark

[11] 3,988,803
[45] Nov. 2, 1976

[54] APPARATUS FOR CENTERING SLAUGHTERED CARCASSES CUT OPEN FOR CLEAVING

[75] Inventor: Karl-Erik Ingemar Hamark, Varberg, Sweden

[73] Assignee: Meat Industry Technique mit Aktiebolag, Sweden

[22] Filed: Feb. 14, 1975

[21] Appl. No.: 550,056

[30] Foreign Application Priority Data
Feb. 21, 1974  Sweden................ 7402271

[52] U.S. Cl. .................................. 17/23
[51] Int. Cl.² ............................ A22B 5/20
[58] Field of Search .......... 17/23, 24, 14, 17, 21

[56] References Cited
UNITED STATES PATENTS

| | | | |
|---|---|---|---|
| 2,696,633 | 12/1954 | Hincks | 17/21 |
| 2,897,537 | 8/1959 | Schmidt, Jr. | 17/21 |
| 3,095,602 | 7/1963 | Kottner | 17/23 |
| 3,533,131 | 10/1970 | Ivarsson | 17/23 |
| 3,599,277 | 8/1971 | Brown | 17/21 |

FOREIGN PATENTS OR APPLICATIONS

| | | | |
|---|---|---|---|
| 125,508 | 3/1973 | Denmark | 17/23 |
| 480,802 | 11/1969 | Switzerland | 17/23 |
| 153,184 | 4/1963 | U.S.S.R. | 17/21 |

*Primary Examiner*—Hugh R. Chamblee
*Assistant Examiner*—James D. Hamilton
*Attorney, Agent, or Firm*—Ladas, Parry, Von Gehr, Goldsmith & Deschamps

[57] ABSTRACT

The present invention relates to an apparatus for centering slaughtered carcasses. The apparatus is meant to be used at the cleaving of slaughtered carcasses, for instance, of pigs, which have been cut open where a stationary support rail is provided for suspending the carcass from its hind legs, said apparatus comprising a first member for engagement with the hind legs of the carcass for symmetrically pressing said hind legs against a stationary horizontal first support rail for initially centering the carcass. Furthermore, the apparatus comprises a second support rail adapted for preventing rotation of the carcass preferably in the nature of a horizontal second support rail, and a second member for engagement with the lower jaw of the carcass, said second member being pivotally movable along a centering line in order to finally center the carcass and being operable by means of a power device.

3 Claims, 3 Drawing Figures

APPARATUS FOR CENTERING SLAUGHTERED CARCASSES CUT OPEN FOR CLEAVING

FIELD OF THE INVENTION

The present invention relates to an apparatus for centering slaughtered carcasses and is meant to be used for cleaving cut-open slaughtered carcasses, in particular smallsize carcasses, for instance of pigs.

DESCRIPTION OF PRIOR ART

Several installations for cleaving cut-open slaughtered carcasses are previously known which comprise an apparatus for centering the slaughtered carcasses. A prior-art installation of this kind comprises a device for suspending the carcass from its hind legs, a cutting member in the nature of a circular saw displaceably guided for vertical movement along the freely suspended slaughtered carcass, and means for vertically displacing the circular saw. Apparatus constructed in accordance which this known principle are used today with good results for cleaving slaughtered carcasses of big cattle but cannot be used with the same good results for cleaving slaughtered carcasses of pigs, not even in case an axe with a hewing and cutting motion is used instead of a circular saw in accordance with a known suggestion, since the pig carcass has insufficient volume for remaining in the correct position in relation to the cutting member while hanging freely of its own weight, irrespectively of whether the cutting member consists of a circular saw or an axe, but will turn aside during the cleaving operation so that the cleaving will not take place centrally along the whole carcass.

With respect to cleaving slaughtered carcasses of pigs it is important that the cleaving operation is performed with precision along the spine — centrally through the spine in the case of central cleaving but on both sides of the spine in the case of so-called bacon cleaving — without adjacent membranes in the carcass being lacerated, since these membranes should be intact in order to be able to retain salt solution injected into the carcass if the carcass is subsequently to be salted. Attempts have previously been made to fulfill this requirement by using a pair of guides, placing them against opposite sides of the carcass and keeping the carcass in a fixed position, like squeezing jaws, but this results in a rather complicated apparatus.

SUMMARY OF THE INVENTION

The purpose of the present invention is to simplify the cleaving process and to provide means for fixing and centering the carcass in its correct position, without any tendency to disregard the requirement that the carcass should be kept securely fixed in its position in relation to the cutting member (circular saw or axe), in order that the cutting member may pass through the carcass along the spine and, in the central cutting operation, which is most frequently used, centrally through the spine during the cleaving operation.

A preferred embodiment of the invention comprises an apparatus for centering cut-open shoughtered carcasses to be cleaved where means are provided for suspending the carcass from its hind legs, said apparatus comprising a first member for engagement with the hind legs of the carcass for symmetrically pressing the hind legs against a stationary horizontal first support rail for initially centering the carcass. Furthermore the apparatus comprises means for preventing rotation of the carcass, preferably in the nature of a horizontal second support rail, and a second member for engagement with the lower jaw of the carcass, said second member being pivotally movable along a centering line in order to finally center the carcass and being operable by means of a power device.

BRIEF DESCRIPTION OF THE DRAWINGS

In order to elucidate it the invention will be described in more details in the following with reference to the accompanying drawings, in which.

DESCRIPTION OF THE PREFERRED EMBODIMENT

Figure 1:
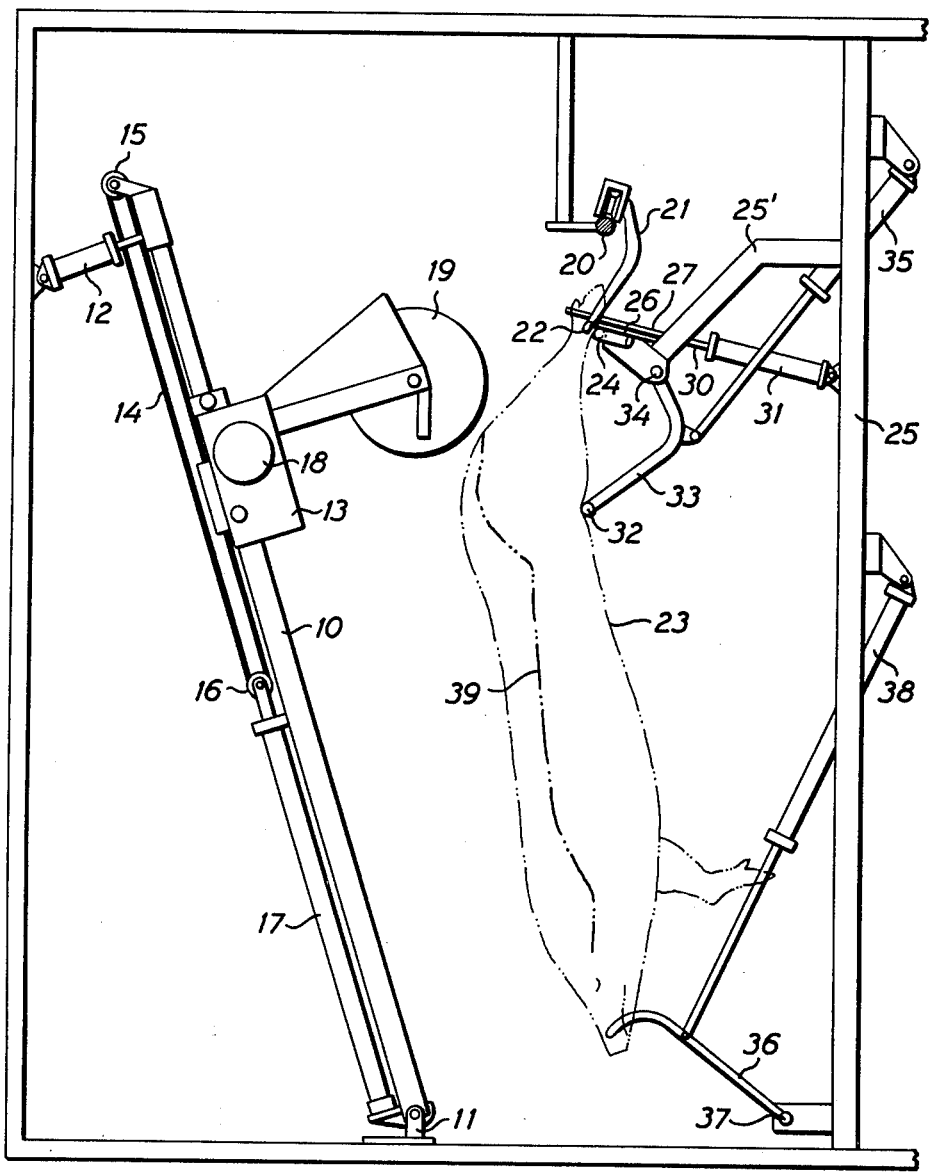
FIG. 1 is a side view of an embodiment of the apparatus according to the invention which has been chosen by way of example.
Figure 2:
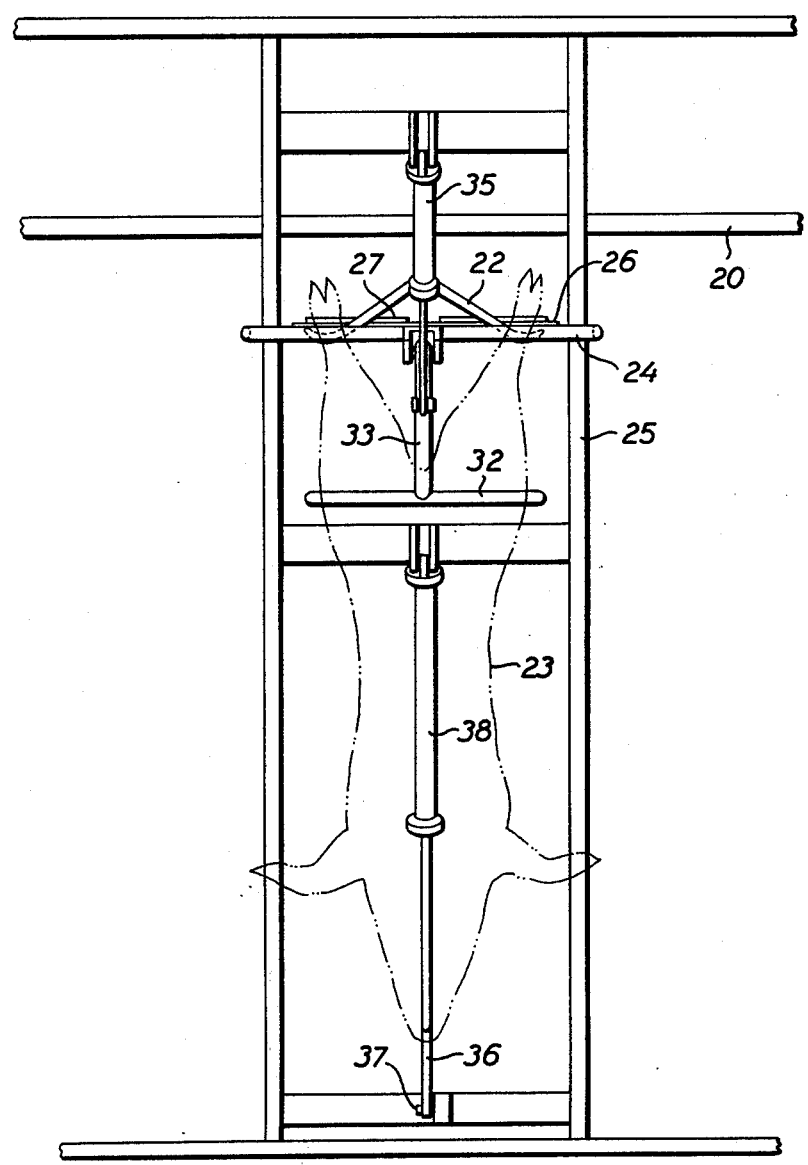
FIG. 2 is a front view of the apparatus of FIG. 1

With reference to the drawings, the apparatus comprises a swingable frame 10 which is journalled in a bearing 11 stationarily mounted in the floor, for pivoting about a horizontal axis and is connected at the top with a hydraulic or pneumatic cylinder 12 which is anchored in the wall or is connected with another stationary anchoring means, the frame being located in the shown position when the cylinder 12 is contracted, which is the retracted or rest position of the frame, while the frame is pivoted to a more upright position when the cylinder 12 is projected, which is the operating position of the frame.

The frame 10 forms a guide for a slider 13 which is displaceably guided for movement up and down along the frame. The slider is connected with a wire 14 running over a pulley 15 at the top and of the frame and over a block 16 which is connected with the movable portion of a hydraulic or pneumatic cylinder 17, which is stationarily mounted in the frame along said frame. The wire consequently forms a tackle between the slider 13 and the cylinder 17. In its shown position the slider 13 is in an upper end position, the cylinder 17 being contracted, and when the cylinder is projected, the slider will slide of its own weight downwardly along the frame and will then be lifted up once more to the upper end position shown through contraction of the cylinder. Another device than one described may of course be provided in order to bring about the necessary movement by the slider. The said slider carries an electric driving motor 18 which is connected by means of a carefully encased belt or chain transmission or in another way to a circular saw blade 19 projecting freely from said slider.

On a conventional suspension track 20 there is provided a movable suspension iron 21 having a rotatable gallows 22 for suspending a cut-open slaughtered carcass 23 of a pig by inserting the pointed ends of the gallows through the hind legs inside the heel tendon. The suspension trach may be combined with means for scalding, singeing, etc. of the carcasses on one side of the apparatus and with other stations for treating the carcasses cloven in the apparatus on the other side of the apparatus, so that the said apparatus is merely one stop in the path of the carcasses on the suspension track through the slaughterhouse. Instead of being suspended from the gallows the carcass may be suspended with the respective hind leg in an individual hook movable on the suspension track. In that case said suspension track may be provided before the apparatus with an abutment stopping an arriving carcass and provided with means for moving the hocks one at a time past the abutment so that the carcass is brought into position in the apparatus with the hind legs spread as a result of one hook being moved past the abutment while the other hook is retained at the abutment. A device of this kind in combination with suspension conveyors is known per se in apparatus for central cleaving of slaughtered carcasses of big cattle and will not, therefore, require any detailed description. The essential thing is that the slaughtered carcass is suspended from the hind legs in the apparatus, which is preferably done by means of a movable gallows but may be brought about by any other suitable means and may even be performed by suspending the carcass manually from two stationarily mounted spaced hooks. The suspended carcass must turn its back towards the frame 10.

Figure 3:
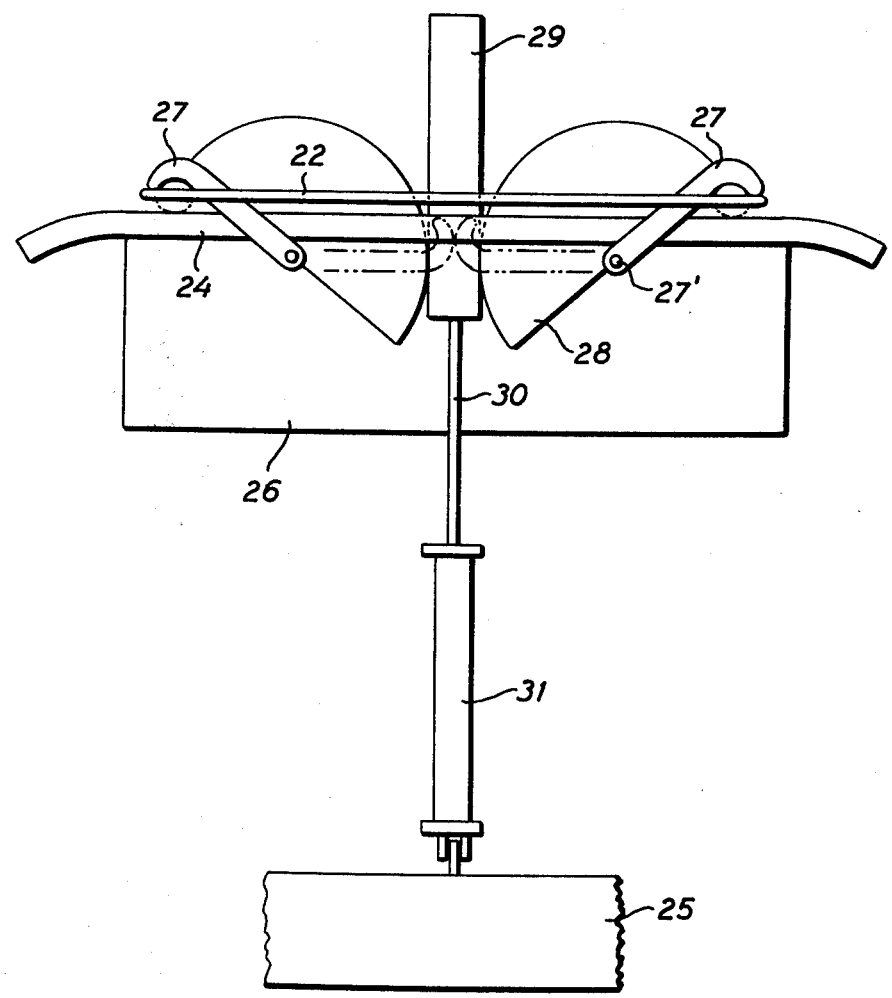
FIG. 3 is an enlarged plan view of the second member forming part of the apparatus for centering and fixing the hind legs of the carcass.

Below the suspension track, approximately on a level with the gallows 22, there is disposed a stationary support 24 which is carried by a stationary frame 25 on an arm 25' projecting therefrom. This support consists of a horizontal first support rail, preferably a tube or pipe which extends in parallel with the suspension track through a distance on each side of the vertical plane passing through the saw blade. It is not located exactly below the suspension track 20 but slightly to the left of the vertical plane through the suspension track as seen in FIG. 1, the displacement being approximately 5 cm. Due to this displacement the carcass will consequently be kept in contact with the support of its own weight. In order to facilitate the sliding motion of the carcass onto and off from the support without lacerating the carcass, the ends of the support are shaped so as to form angles to the right, as seen in FIG. 1, having a rounded-off configuration. Above the support there are swingably mounted two hooks 27 on a plate 26 or the like, the journalling points of said hooks being indicated at 27', and the said two hooks are fixedly connected each with one semicircular gear segment 28. The gear segment engage with a double-sided straight rack 29 which is connected with a piston 30 of a hydraulic or pneumatic cylinder 31. By means of this cylinder the hooks may consequently be swung between the position shown in continuous lines in FIG. 3, corresponding to a projected cylinder, and the position shown in double dot and dash lines in FIG. 3 corresponding to a contracted cylinder, the hooks moving in the interspace between the spread legs on the carcass suspended from the gallows. In the former position the two hooks cause the hind legs to be pressed against the support 24 so that the hind legs are maintained in a carefully fixed and centered position on the support, which is determined by the two hooks. If the carcass should not have been placed exactly in the centre of the apparatus the hook 27 when swung to the position shown in continuous lines in FIG. 3 will move it to a carefully determined and fixed position in which the spine of the carcass will be located with its central line essentially centered. In the position shown in double dot and dash lines the two hooks are retracted so far that they are located inside the active support face of the support 24 in order that they may not hinder the passage of the carcass when the carcass is moved into the apparatus on the suspension track with the hind legs sliding against the support.

Below the support 24 there is provided a second support 32 consisting of a support rail, preferably a tube or pipe, essentially parallel to the support 24 and the suspension track 20 and the said support is carried by a rocker arm 33 which is pivotally mounted on the arm 25' of the frame 25 at 34 for pivoting about an axis essentially parallel to the suspension track. The rocker arm 33 is connected to a hydraulic or pneumatic cylinder 35 which is anchored in the frame 25, and by means of this cylinder the support 32 can be moved to the operative position shown in FIG. 1 and can be retracted to a rest position. This support is placed against the belly of the carcass in the vicinity of the place where the cleaving is to begin, only after the carcass has been fixed against the stationary support 24 by means of the hooks 27, and will give additional support to the carcass at his place in particular for preventing rotation of the carcass about its longitudinal axis.

On the frame 25 a hook 36 is pivotally mounted at the bottom at 37 and it is connected to a hydraulic or pneumatic cylinder 38 for moving the hook 36 between the active position shown and a position swung upwardly and rearwardly. This hook is to be moved by means of a cylinder 38 into the carcass cut open in the belly, through the cut in order to be brought into engagement with the lower jaw from above. During this movement the hook is guided in the V-shaped recess which is formed by the bones in the lower jaw and has its point directed downwardly when the carcass is suspended, which results in exact centering of the lower end of the carcass.

When the hook has firmly gripped this recess, power is exerted on the hook so that the carcass will be stretched between the gallows 22 and the hook 36. As a result, the carcass will be stretched and will be suspended straight and in a stable manner in a centered position. At the same time a certain straightening of the spine is brought about, said spine is indicated in FIG. 1 by means of thin double dot and dash line 39.

When the carcass has been stretched in the manner described the saw blade 19 is moved to a position centrally above the body portion of the carcass between the hind legs by the frame 10 being swung to the right, as seen in FIG. 1, by means of the cylinder 12. The motor 18 is started and the slider 13 is lowered by means of the cylinder 17. The rotating saw blade 19 will then work itself successively down through the carcass centrally through the spine 39 without the carcass having any possibility of moving aside. The result is that the carcass is cloven in two exactly identical halves along a cut without lacerating adjacent membranes in the carcass. On the frame 10 there should be provided some sort of limit position switch which will automatically cause the movement of the slider 13 to reverse itself approximately 5 to 10 cm above the hook 36 so that the saw blade will not come into contact with the hook. Suspended from the suspension iron 21 the carcass may be moved out of the apparatus on the suspension track 20 after the hook 36 and the support 32 have been retracted, the hooks 27 have been swung to their free position and the frame 10 has been inclined rearwardly (to the left in FIG. 1) to the position shown in FIG. 1.

The cleaving operation may possibly be performed while the saw blade 19 is being continuously doused with water, and means may also be provided for sterilization. Instead of the saw blade another cutting member may be provided, for instance a simple axe, to which a hewing motion is imparted, or else a corresponding double axe may be provided in case so-called bacon cleaving is to take place, in which case the carcass is cloven on both sides of the spine. The various movements of the frame 10, the slider 13, the saw blade 19, the hooks 27, the support 32 and the hook 36 may be controlled by programming means.

What we claim is:

1. An apparatus for centering cut-open slaughtered carcasses to be cleaved, in particular slaughtered carcasses of pigs where means are provided for suspending the carcass from its hind legs, comprising a stationary horizontal first support rail, a first member for engaging the hind legs of the carcass for symmetrically pressing said hind legs against said stationary horizontal first support rail for initially centering the carcass; means for preventing rotation of the carcass;

a second member for engagement with the head end of the carcass, said second member being pivotally movable in a verticle plane along a centering line and being non-movable in a horizontal direction;

power means for moving said second member in a vertical plane along the centering line, and said means for preventing the rotation of the carcass comprises a second support rail adapted to be displaceable towards the belly of the carcass between the head end and the hind portion of the carcass and which is parallel to said first support rail.

2. Apparatus as claimed in claim 1, wherein said first member comprises two hook members symmetrically disposed on both sides of said centering line for the carcass.

3. Apparatus as claimed in claim 1, wherein said second member comprises a hook for engagement with the lower jaw of the carcass.

* * * * *